United States Patent Office 2,783,252
Patented Feb. 26, 1957

2,783,252
MANUFACTURE OF 17-KETOSTEROIDS

Josef Schmidt-Thomé, Frankfurt am Main, Germany, assignor to Farbwerke Hoechst Aktiengesellschaft vormals Meister Lucius & Brüning, Frankfurt am Main, Germany, a corporation of Germany No Drawing. Application February 16, 1954,
Serial No. 410,741

Claims priority, application Germany February 26, 1953

5 Claims. (Cl. 260—397.4)

The present invention relates to the manufacture of 17-ketosteroids from 17-hydroxy-20-ketosteroid oximes.

I have found that 17-ketosteroids can be obtained in practically quantitative yields by subjecting 17-hydroxy-20-ketosteroid oximes to a molecular rearrangement under the reaction conditions used for the Beckmann transformation, whereby the 17-ketones are obtained directly. The reaction is believed to proceed according to the following scheme wherein R represents the three nuclei A, B and C of the cyclopentanopolyhydrophenanthrene structure.

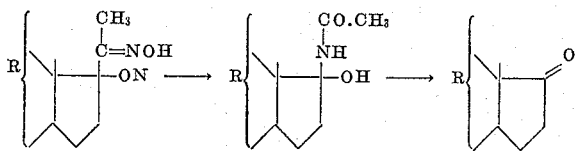

According to this scheme it is assumed that an intermediate product is formed during the reaction, containing a hydroxyl group and an acetylamino group at C17, the formula of this product being as given above.

The 17-hydroxy-20-ketosteroids required for the preparation of the 17-hydroxy-20-ketosteroid oximes can be easily prepared by way of $\Delta^{17.20}$-enol acetates by a method according to Gallagher (J. Biol. Chem., volume 179 (1949), page 507; J. Amer. Chem. Soc., volume 73 (1951), pages 184–189) or from 16.17-unsaturated 20-ketosteroids by way of 16.17-oxides (Julian et al., J. Amer. Chem. Soc., volume 72 (1949), page 5145) which are subsequently split up as described in copending U. S. patent application Serial No. 387,302. The oximes are obtained from the 17-hydroxy-20-ketones in known manner.

It is advisable to protect any hydroxyl groups present in the steroid molecule by acylation or conversion into ether groups before transformation takes place. The course of the reaction is, however, not influenced by double bonds in the steroid residue or by the fact as to whether any of the rings forming the steroid molecule is an aromatic nucleus; an intermediate protection of the double bond is therefore unnecessary.

The transformation according to the Beckmann method of the 17-hydroxy-20-ketoximes is carried out in known manner. As agents which effect the molecular rearrangement there may be used inorganic and organic acid chlorides, for example phosphorus pentachloride, phosphorus oxychloride, thionyl chloride, acetyl chloride and the like. Aromatic sulfonic acid chlorides, for example benzene sulfonic acid chloride or p-toluene-sulfonic acid chloride may also be used. Furthermore, there may be employed inorganic acids such as hydrochloric acid or sulfuric acid and anhydrides of organic acids such as acetic anhydride.

It is of advantage to carry out the transformation in the presence of solvents. The use as solvents of tertiary amines such as pyridine, dimethylaniline, quinoline and the like is of particular advantage. A mixture of phosphorus oxychloride and pyridine is especially suitable for the reaction.

The following examples serve to illustrate the invention but they are not intended to limit it thereto:

Example 1

300 mgs. of $\Delta^5$-pregnene-3$\beta$.17$\alpha$-dihydroxy-20-one-3-acetate-20-oxime are dissolved in 3 cc. of pyridine and treated with a mixture of 1 cc. of phosphorus oxychloride and 2 cc. of pyridine, while cooling in ice. The reaction mixture is allowed to stand for 3 hours at 0° C. and is then poured into ice water. A colorless precipitate forms which is filtered off and dried. About 250 mgs. (98 percent of the theoretical yield) of dehydro-epiandrosterone acetate are obtained of melting point 170° C. After recrystallization from aqueous acetone, needle shaped crystals are obtained of melting point 171° C. No depression of the mixed melting point with an authentic sample of dehydro-epi-androsterone is observed.

Example 2

500 mgs. of allo-pregnane-3$\beta$.17$\alpha$-dihydroxy-20-one-3-acetate (in 15 cc. of ethanol) are heated to boiling for three hours with an alcoholic solution of hydroxylamine acetate which has been prepared from 500 mgs. of hydroxylamine hydrochloride and 600 mgs. of sodium acetate. The solution is concentrated and then poured into water. The precipitated oxime is filtered off and dried. 500 mgs. of allo-pregnane-3$\beta$.17$\alpha$-dihydroxy-20-one-3-acetate-20-oxime are obtained of melting point 250° C. After recrystallization from alcohol, the oxime has a melting point of 256° C.

300 mgs. of the oxime are dissolved in 3 cc. of pyridine. To this solution produced is added a mixture of 1 cc. of phosphorus oxychloride with 2 cc. of pyridine, while cooling in ice. The reaction mixture is allowed to stand for 2 hours at 0° C. and then poured into a mixture of ice and 7 cc. of concentrated hydrochloric acid. The reaction product is extracted with ether and the ethereal solution is washed with a dilute sodium hydroxide solution and with water and dried with sodium sulfate. The ether is distilled off and the residue is recrystallized from aqueous alcohol. 230 mgs. (90 percent of the theoretical yield) of epi-androsterone acetate (3$\beta$-hydroxy-17-ketoandrostane acetate) are obtained of melting point 94° C.

150 mgs. of the product thus obtained are hydrolized over night at room temperature in a mixture of 4 cc. of alcohol and 1 cc. of a sodium hydroxide solution of 4 percent strength. The reaction mixture is poured into water and extracted with ether. The ethereal solution is washed with water and the ether is distilled off. The residue is recrystallized from aqueous alcohol and yields pure epi-androsterone (3$\beta$-hydroxy-17-ketoandrostane) of melting ponnt 173° C. The optical rotation of this product in methanol is +88.5°.

I claim:

1. The process for the preparation of a 17-ketosteroid selected from the group consisting of the androstane, etiocholane and etiocholene series by means of a Beckmann rearrangement which comprises subjecting a 17-hydroxy-20-ketosteroid oxime of a member selected from the group consisting of the allopregnane, pregnane and pregnene series to the action of a member selected from the group consisting of inorganic and organic acid chlorides and in the presence of a solvent.

2. The process as claimed in claim 1, which comprises subjecting a 17-hydroxy-20-ketosteroid of the said series to the action of an inorganic acid chloride in the presence of a tertiary base as solvent.

3. The process as claimed in claim 1, which comprises subjecting a 17-hydroxy-20-ketosteroid of the said series to the action of a mixture of pyridine and phosphorus oxychloride.

4. The process of preparing dehydro-epiandrosterone acetate by means of a Beckmann rearrangement which comprises subjecting $\Delta^5$-pregnene-3β-17α-dihydroxy-20-one-3-acetate-20-oxime to the action of a mixture of pyridine and phosphorus oxychloride at a temperature of about 0° C.

5. The process of preparing epi-androsterone-(3β-hydroxy-17α-ketoandrostane) by means of a Beckmann rearrangement which comprises subjecting allo-pregnane-3β-17α-dihydroxy-20-one-3-acetate-20-oxime to the action of a mixture of pyridine and phosphorus oxychloride at a temperature of about 0° C., and hydrolyzing the epi-androsterone acetate thus obtained in a solution of sodium hydroxide in ethyl alcohol.

References Cited in the file of this patent
UNITED STATES PATENTS

| | | |
|---|---|---|
| 2,212,363 | Bockmuhl | Aug. 20, 1940 |
| 2,335,616 | Tendick | Nov. 30, 1943 |
| 2,531,441 | Julian | Nov. 28, 1950 |
| 2,656,364 | Hershberg | Oct. 20, 1953 |

FOREIGN PATENTS

| | | |
|---|---|---|
| 563,889 | Great Britain | Sept. 4, 1944 |

OTHER REFERENCES

Fieser et al., Natural Products Related to Phenanthrene, 3rd Ed., pp. 361–62 (1949).